(12) United States Patent
Liu et al.

(10) Patent No.: US 6,438,278 B1
(45) Date of Patent: Aug. 20, 2002

(54) FIBER OPTICAL CIRCULATOR

(75) Inventors: Zhimin Liu, San Jose; Jiwu Ling, Santa Clara, both of CA (US)

(73) Assignee: Telelight Communication Inc., San Jose, CA (US)

( * ) Notice: Subject to any disclaimer, the term of this patent is extended or adjusted under 35 U.S.C. 154(b) by 0 days.

(21) Appl. No.: 09/239,203

(22) Filed: Jan. 28, 1999

Related U.S. Application Data (60) Provisional application No. 60/074,562, filed on Feb. 12, 1998.

(51) Int. Cl.[7] .............................. G02B 6/00; G02B 5/30
(52) U.S. Cl. ............................ 385/11; 385/31; 385/36; 385/27; 359/494; 359/496
(58) Field of Search .............................. 385/11, 15, 27, 385/33–36, 24; 359/484, 494–496

(56) References Cited

U.S. PATENT DOCUMENTS

| | | | |
|---|---|---|---|
| 5,471,340 A | * 11/1995 | Cheng et al. | 359/281 |
| 5,878,176 A | * 3/1999 | Cheng | 385/11 |
| 5,930,039 A | * 7/1999 | Li et al. | 359/484 |
| 6,014,244 A | * 1/2000 | Chang | 385/11 |
| 6,175,448 B1 | * 1/2001 | Xie et al. | 359/497 |
| 6,226,115 B1 | * 5/2001 | Shirasaki et al. | 359/280 |

* cited by examiner

*Primary Examiner*—Rodney Bovernick
*Assistant Examiner*—Juliana K. Kang (74) *Attorney, Agent, or Firm*—Thomas I. Rozsa; Tony D. Chen (57) ABSTRACT

A fiber optical circulator in which is a light beam is fed from a fiber of a first port in a dual core glass capillary, then collimated before being passed to a birefringent crystal wherein the light beam is divided into two orthogonal components o and e with a displacement. The State of Polarization (SOP) of components then are changed into the same, perpendicular to the incident plane of the birefringent crystal prism by the group of Faraday Rotator and two Half-Wave Plates (HWP) that have different optical axis orientation and cover o and e components respectively. Then the light components with the same SOP pass into a birefringent prism where they receive angle correction to meet receiving requirement in incident angle for the fiber of port 2 without displacement due to their SOP. This is followed by a second group of HWP and Faraday Rotator that changes the SOP of two components back to orthogonal. The light beam of components then pass into the second birefringent crystal which combines the o and e components together and pass through collimator lens, and are received by optical fiber of the second port. The optical path from the second port to the third port is similar to that described above. However, due to the non-reciprocal property of the Faraday Rotator, the SOP of the two light components from the second port will be in the incident plane of the crystal prism, therefore receive a displacement after the birefringent crystal prism. This displacement combined with angle correction allows the light from the second port is fed into the fiber of the third port. An alternative design uses a pair of glass prism and a plane crystal to replace the function of crystal prism in the preferred embodiment.

8 Claims, 6 Drawing Sheets

FIBER OPTICAL CIRCULATOR

This application claims the benefit of provisional application Ser. No. 60/074,562, filed Feb. 12, 1998.

BACKGROUND OF THE INVENTION

1. Field of the Invention

The present invention generally relates to the field of fiber optic circulators. More particularly, the present invention relates to the field of compact, low cost and high performance optical circulators, which can expanded to any number of ports.

2. Description of the Prior Art

The fiber optic circulator transfers light from a port to another sequentially. It is a passive optical junction of three or more ports. The ports can be accessed in such order that when a light beam is fed from an optical fiber to any port it is transferred to the next port. Typically, a light beam enters the circulator through a first port and exits through a second port. Another light that enters the second port exits through a third port and so on. Since the optical circulator is an inherently non-reciprocal device, the light never goes to other ports.

Such an optical device has a broad range of applications in the field of fiber optic communication systems, such as in bi-directional communication, dense Wavelength Division Multiplexing (WDM) and Dispersion Compensation.

Many types of optical circulators have been developed and manufactured. However, the high cost and bulky size of the circulator have limited the popular acceptance for system applications.

SUMMARY OF THE INVENTION

The present invention is a novel and unique fiber optic circulator which consists of two identical modules and one (for three port) or two (for four port) angles adjustor that allow two optical fibers to share one collimator lens and one birefringent crystal to achieve compactness and low cost.

In summary, a light beam is fed into the fiber of the first port in a dual fiber glass capillary, then collimated before being passed to a birefringent crystal wherein the light beam is divided into tow orthogonal components o and e with a displacement. The light beams of components then pass through the first Faraday Rotator that rotates the State of Polarization (SOP) of both components counterclockwise 45°. The components then pass into two Half-Wave Plates (HWP) that cover o and e components respectively.

One HWP is set 22.5° against to horizontal for the e component and another one is set −22.5° against to horizontal for the o component. The two components are in the same SOP in horizontal direction after the HWP. Then the light components pass into a birefringent prism which bents the light beams to be parallel to central axis of the circulator without displacement due to their SOP.

This is followed by a second pair of half wave plate, which changes the SOP of two components 45° in opposite directions. This is followed by the Faraday rotator which rotates the components into orthogonal, the same as that after the first birefringent crystal. The light beam of components then pass into the second birefringent crystal which combines the o and e components together and pass through collimator lens, and are received by optical fiber of the second port.

The optical path from the second port to the third port is similar to that described above. However, due to the non-reciprocal property of the Faraday rotator, the SOP of the two light components from the second port will be perpendicular to the horizontal after Faraday rotator and half wave plates therefore receive a displacement after the walk-off birefringent crystal. This displacement the angle correction provided by the crystal prism allows that the light from the second port is fed into the fiber of the third port.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1c shows the optical axis of the half wave plates of FIG. 1a;

FIG 3e is a top plan view of the fiber optic circulator shown in FIG 3a;

FIG. 5b is an alternative embodiment of the present invention shown in FIG 5a; and FIG. 5c is another embodiment of the present invention shown in FIG. 5a.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1A:
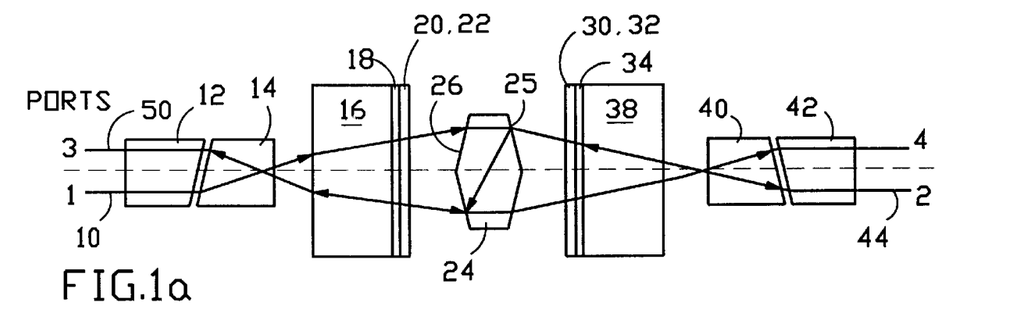
FIG. 1a is a side view of a birefringent crystal prism depicting the structure and optical path of port 1 to port 2, port 2 to port 3 and port 3 to port 4.

As shown in FIG. 1a, since the optical fiber 10 of port 1 is positioned in a dual core glass capillary 12 under the optical axis of the collimator lens 14 (which can be a GRIN lens), a light beam is fed from fiber 10 to collimator lens 14 where it is collimated and has an angle θ with the symmetrical axis of the circulator.

Figure 1B:
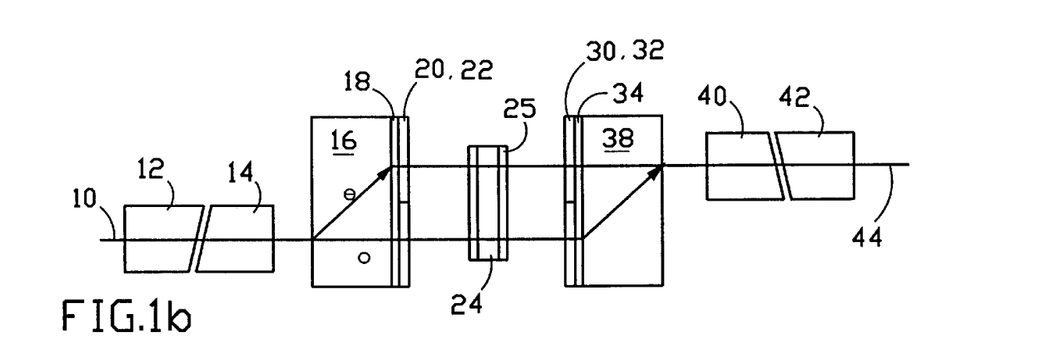
FIG. 1b is top plan view of the fiber optic circulator shown in FIG. 1(a)

The dual fiber is not necessarily immediate close each other, the angle θ is dependent on the distance between the fiber core and the optical axis of the collimator lens and type of the collimator lens. After the light beam passes through birefringent crystal 16 it is divided into two components of o light and e light having orthogonal State Of Polarization (SOP) with displacement. This is shown in FIG. 1b.

FIG. 2 illustrates the SOP and the light beam positions at the intersection of each functional element. The walk-off direction of the birefringent crystal 16 can be either in a vertical or in a horizontal direction. The Faraday rotator 18 then rotates the SOP of both o and e components counter-clockwise 45°.

Figure 1C:
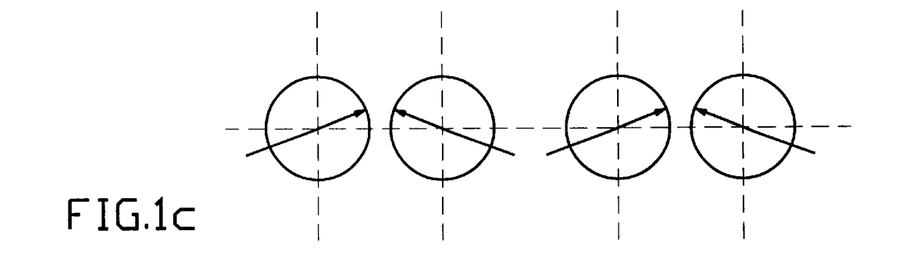

The optical axis of the half wave plate 20 is set at an angle of 22.5° against the horizontal. The optical axis of the half wave plate 22 is set at a −22.5° as shown in FIG. 1c. Half wave plates 20 and 22 are positioned to cover the beam of o and e components, respectively. The SOP of the two components is the same, in a horizontal direction after half wave plates 20 and 22. The optical axis of a crystal prism 24 is designed to allow light polarization in a horizontal direction to pass without displacement and create some displacement for light with polarization in a vertical direction.

The crystal prism has four symmetrical optical surfaces with same angle against to symmetrical surface. The prism angle is designed to bent incident light with angle θ from the collimator forward to the symmetrical axis of the circulator in the same angle θ while propagate out the prism. A second set of half wave plates 30 and 32 change SOP of both components into 45° in the opposite direction and a second Faraday rotator 34 rotates them into orthogonal, the same as that after crystal 16.

The second birefringent crystal 38 combines o and e components together. Since the optical state is the same state as that after crystal 16 except for the converted direction from crystal 38, the combined beam is focused into the fiber 44 in the dual core capillary 42 by a second collimator 40.

The optical path from port 2 to port 3 is similar to that discussed above except the SOP. Because the Faraday rotator is an optically irreversible element, the SOP of both o and e components after 30 and 32 are in a vertical direction. The light has displacement in crystal 24 and propagates in the original angle direction after crystal 24. The SOP of the two light components are changed into orthogonal by half wave plates 20 and 22, and the Faraday rotator 18, combined together by birefringent crystal 16, collimated by collimator 14, and received by fiber 50 of port 3.

The process of port 3 to port 4 is similar to that of port 1 to port 2. The port number of such circulator can expanded more as shown in FIG. 2d, the process of port 4 to port 5 is similar to that of port 2 to port 3.

An alternative embodiment of the invention is shown in FIG. 3. The birefringent crystal 16 and 38, Faraday rotators 18 and 34, and half wave plate 20, 22, 30, and 32 have the same functions in this embodiment as that discussed in the preferred embodiment. Planar crystal 60 and two glass prisms 62 and 64 replace the crystal prism in FIG. 1. FIG. 3 shows the optical path and the SOP and positions of light beam after each functional element of the alternative embodiment.

Figure 3A:
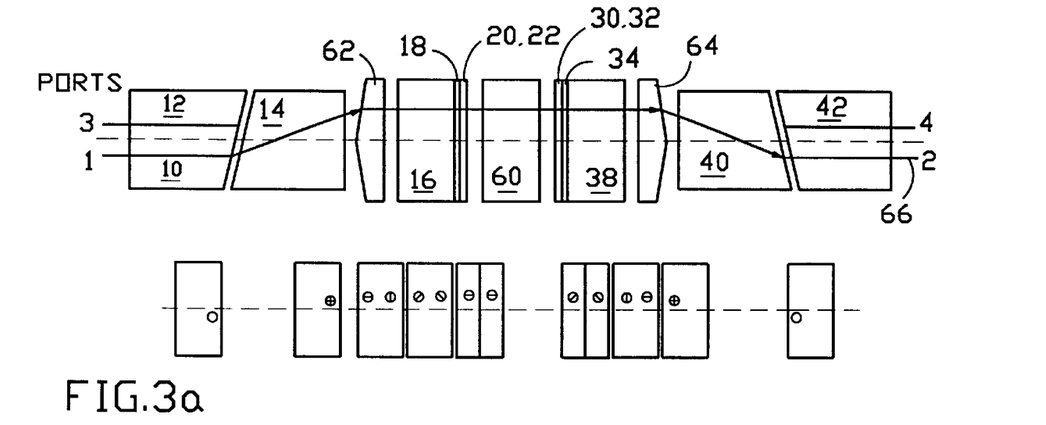
FIG. 3a shows the optical path and the state of polarization for port 1 to port 2.

The light from a fiber 10 in port 1 leaves collimator lens 14 with an angle is bent to be parallel to the optical axis of the system by prism 62. It is then divided into two orthogonal o and e components after birefringent prism 16 and their SOP are rotated into the same horizontal direction by the Faraday rotator 18 and separate half wave plates 20 and 22 as described in the preferred embodiment. It passes through the crystal 60 without displacement due to its SOP in a particular direction. The two light components are rotated into orthogonal by separate half wave plates of 30 and 32 and Faraday rotator 34. They are combined together by birefringent crystal 38.

The light then passes through the prism 64 and it is bent in the same angle as exiting angle from collimator lens 14 forward to the system axis because the 62 and 64 are identical. The light is received by the fiber 66 of port 2 in the dual glass capillary 42.

Figure 3B:
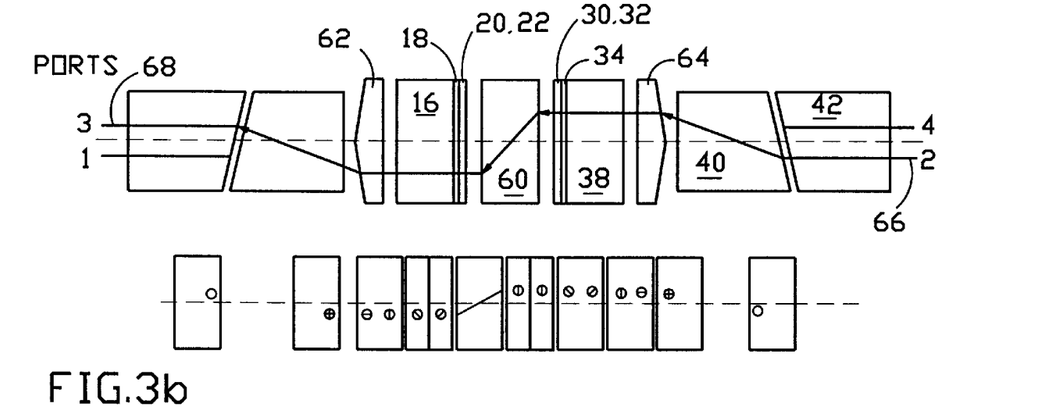
FIG. 3b shows the optical path and the state of polarization for port 2 to port 3.

The optical path from port 2 to port 3 is similar to that described in the preferred embodiment and it is shown in FIG. 3b. The SOP of o and e components of light from port 2 are changed into the same states of polarization in a vertical direction by Faraday rotator 34 and half wave plates 30 and 32. They have a displacement in crystal 60 due to their SOP. They propagate in the same direction after crystal 60 with their SOP being changed into orthogonal by 20 and 22 and by rotator 18. They are then combined together by birefringent crystal 16. The light beam is bent by prism 62 and received by fiber 68 in port 3.

Figure 2A:
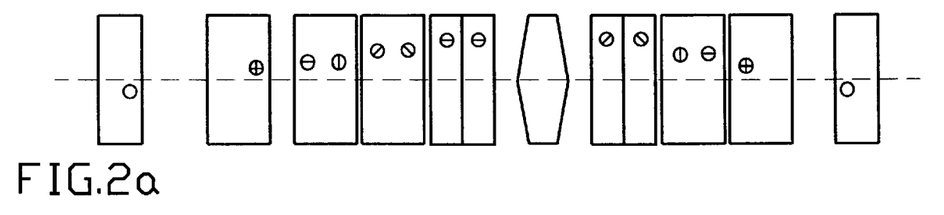
FIG. 2a depicts the state of polarization and the intersection positions of light from port 1 to port 2.
Figure 2B:
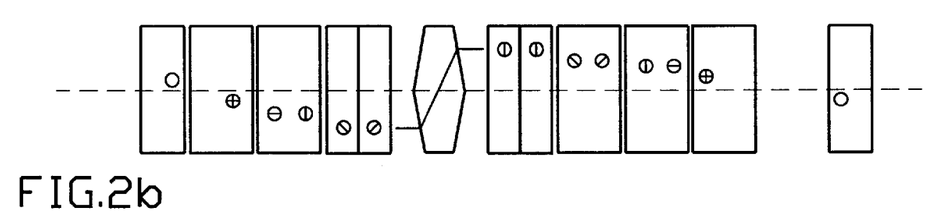
FIG. 2b depicts the state of polarization and the intersection positions of light from port 2 to port 3.
Figure 2C:
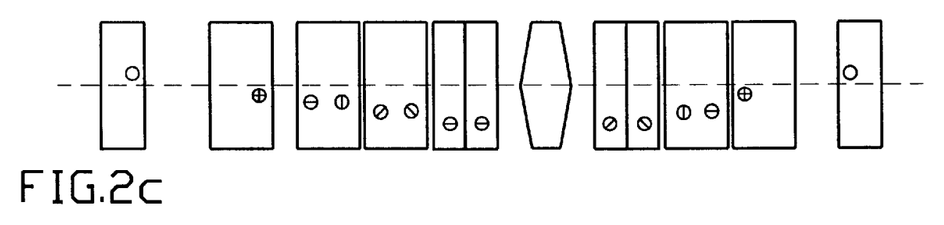
FIG. 2c depicts the state of polarization and the intersection positions of light from port 3 to port 4.
Figure 2D:
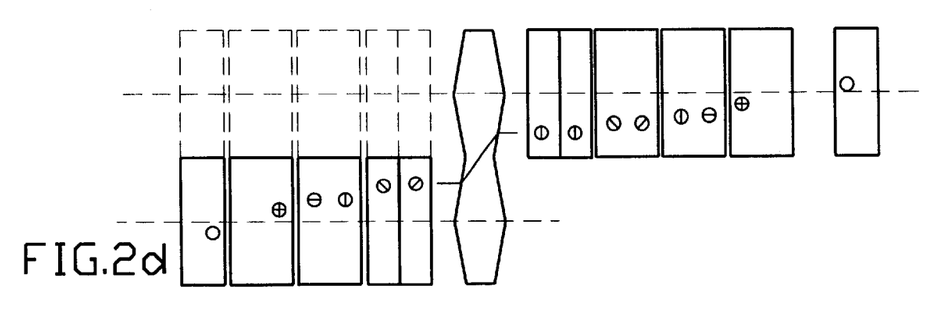
FIG. 2d depicts the state of polarization and the intersection positions of light from port 4 to port 5.
Figure 3C:
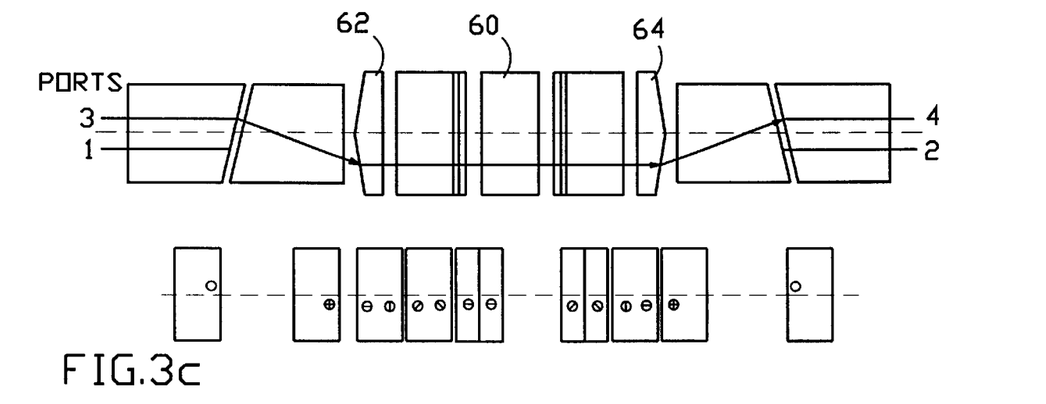
FIG. 3c shows the optical path and the state of polarization for port 3 to port 4.
Figure 3D:
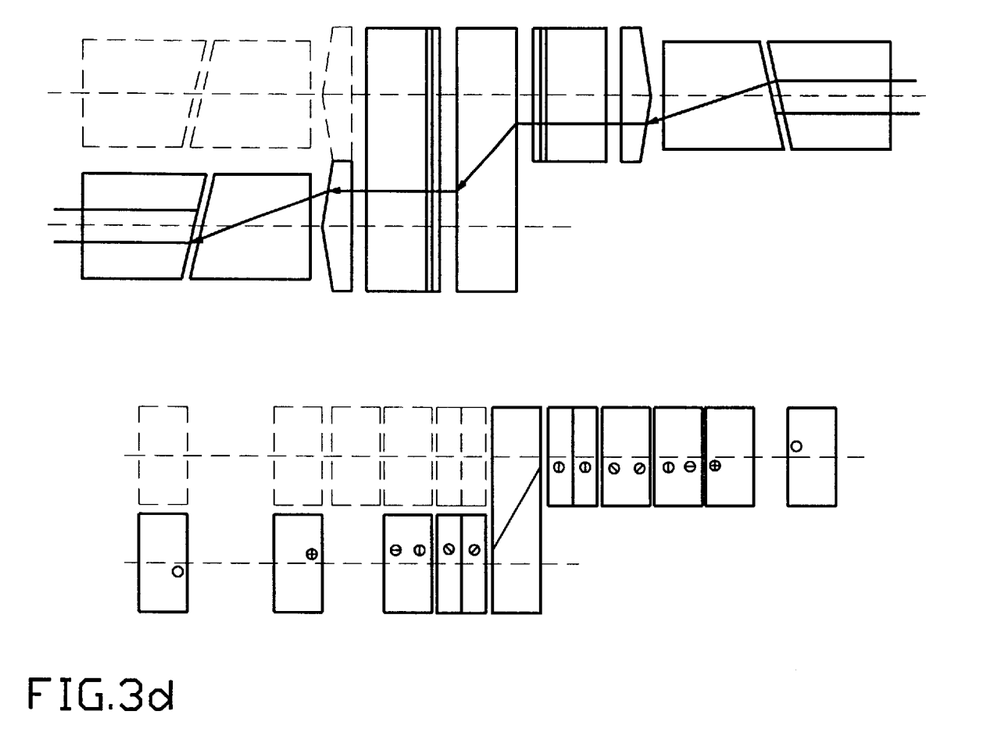
FIG. 3d shows the optical path and the state of polarization for port 4 to port 5.
Figure 3E:
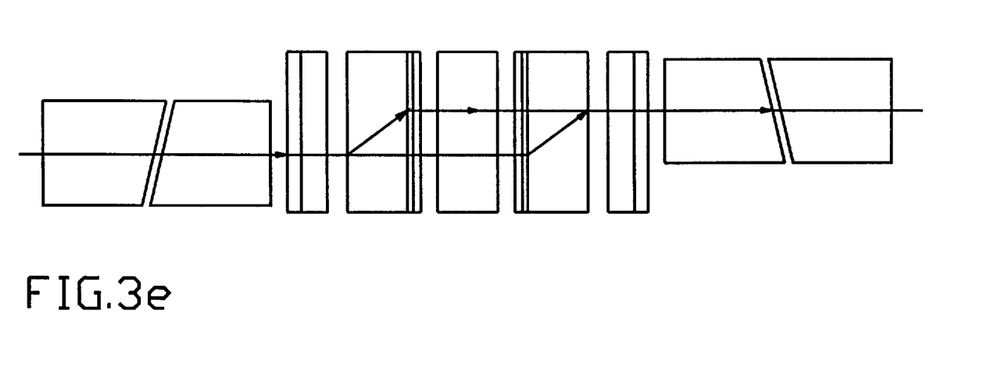

The process from port 3 to port 4 and from port 4 to port 5 as described in relationship to FIGS. 2c and 2d above and the process is illustrated in FIGS. 3c and 3d.

There are other types of alternative designs of the above two basic designs. For example, they can be a three-port circulator by reduced parts. Also the positions of the prism and the walk-off crystal can be exchanges with each other with little difference in performance.

Figure 4A:
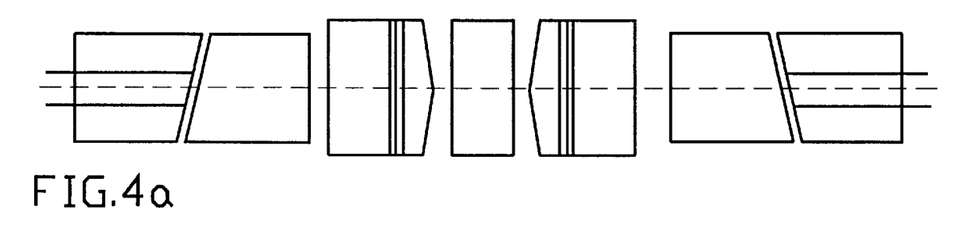
FIG. 4a shows the exchange of positions of the angle corrector and the walk-off crystal.
Figure 4B:
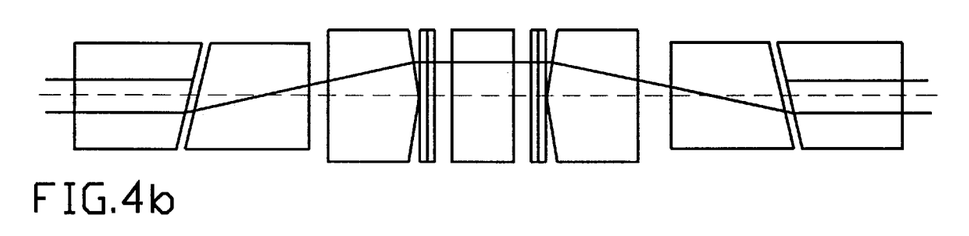
FIG. 4b shows the combining the angle corrector and the walk-off crystal into one element.
Figure 4C:
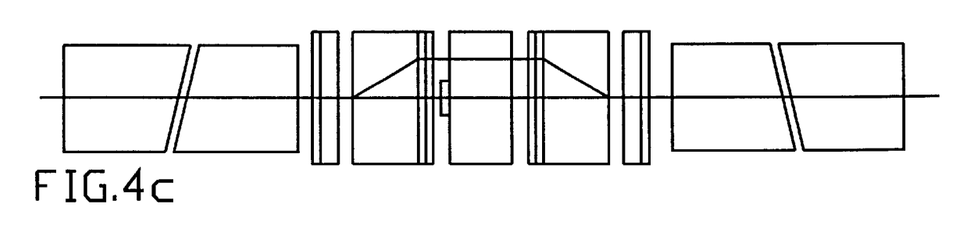
FIG. 4c shows a more balanced structure with compensation of polarization mode dispersion.
Figure 5A:
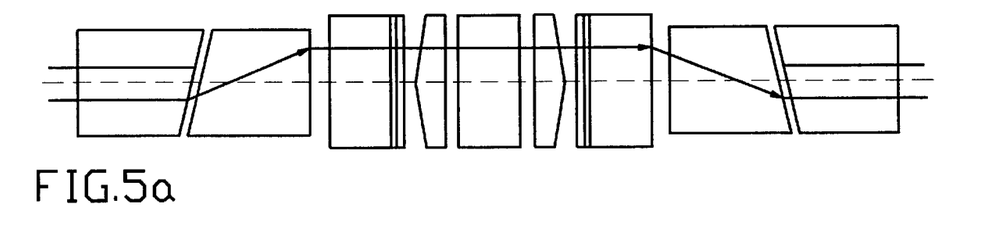
FIG. 5a shows the exchange of positions of the angle corrector and the walk-off crystal.
Figure 5B:
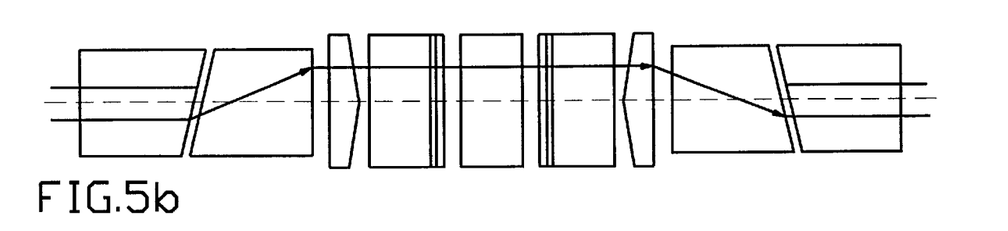
Figure 5C:
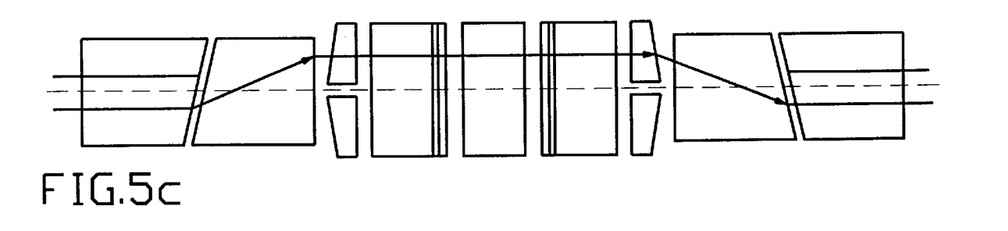

In addition, both designs can be expanded into multi-port more than four-port. The walk-off crystal can be designed having an angled surface on one side to eliminate the need of glass prism. It can be more symmetrical structure with higher Polarization Mode Dispersion (PMD) that can be compensated by a glass piece in optical path of o component as shown in FIG. 4c. These alternatives are shown in FIG. 4.

Defined in detail, the present invention is a fiber optical circulator, comprising: (a) a first dual core glass capillary for housing two optical fibers of a first port and a third port respectively; (b) a first collimator lens for collimating a light beam from said first port; (c) a first birefringent crystal for dividing said collimated light beam into two orthogonal components with a displacement; (d) a first Faraday rotator for rotating the state of polarization of said two components; (e) a first pair of half-wave plates each for passing a respective one of said two components, and causing said two components to be in the same state of polarization in a particular direction; (f) a crystal prism having an optical axis designed to allow light components polarized in said particular direction to pass without displacement but create a displacement in light components polarized in another direction perpendicular to said particular direction, such that said two components in the same state of polarization in said particular direction passes the crystal prism without displacement, and said crystal prism further having a prism angle designed to correct the angles of said two components, causing said two components to be parallel to a central axis of said circulator; (g) a second pair of half-wave plates each for passing a respective one of said two components, and changing the state of polarization of said two components; (h) a second Faraday rotator for rotating the state of polarization of said two components to be orthogonal; (i) a second birefringent crystal for combining said two orthogonal components into a combined light beam; (j) a second collimator lens for focusing said combined light beam; and (k) a second dual core glass capillary for housing another optical fiber of a second port to receive said combined light beam; (l) whereby because of the optically non-reciprocal property of said Faraday rotators, a light beam from said optical fiber of said second port will have two components having their state of polarization in said other direction perpendicular to said particular direction when passing said crystal prism and therefore receiving a displacement therebetween, and will be focused into said optical fiber of said third port, thereby forming an optical circulator.

Defined broadly, the present invention is a fiber optical circulator, comprising: (a) at least one multi-core glass capillary for housing at least two optical fibers of a first port and a third port respectively; (b) at least one birefringent crystal for dividing a light beam from said first port into two components; (c) a crystal prism having an optical axis designed to allow light components polarized in a first direction to pass without displacement but create a displacement in light components polarized in a second direction which is perpendicular to the first direction; (d) at least one optically non-reciprocal means for rotating the state of polarization of said two components and causing said two components to be in the same state of polarization in said first direction to pass said crystal prism without displacement; (e) said crystal prism further having a prism angle designed to correct the angles of said two components; and (f) means for combining said two components into a combined light beam exiting to an optical fiber of a second port; (g) whereby because of said at least one optically non-reciprocal means, a light beam from said optical fiber of said second port will have two components polarized in said second direction when passing said crystal prism and therefore receiving a displacement therebetween, and will exit into said optical fiber of said third port, thereby forming an optical circulator.

Alternatively defined in detail, the present invention is a fiber optical circulator, comprising: (a) a first dual core glass capillary for housing two optical fibers of a first port and a third port respectively; (b) a first collimator lens for collimating said light beam from said first port; (c) a first glass prism having a prism angle designed to correct the angle of said collimated light beam, causing said collimated light beam to be parallel to a central axis of said circulator; (d) a first birefringent crystal for dividing said collimated light beam into two orthogonal components with a displacement; (e) a first Faraday rotator for rotating the state of polarization of said two components; (f) a first pair of half-wave plates each for passing a respective one of said two components, and causing said two components to be in the same state of polarization in a particular direction; (g) a planar crystal having an optical axis designed to allow light components polarized in said particular direction to pass without displacement but create a displacement in light components polarized in another direction perpendicular to said particular direction, such that said two components in the same state of polarization in said particular direction passes the planar crystal without displacement; (h) a second pair of half-wave plates each for passing a respective one of said two components, and changing the state of polarization of said two components; (i) a second Faraday rotator for rotating the state of polarization of said two components to be orthogonal; (j) a second birefringent crystal for combining said two orthogonal components into a combined light beam; (k) a second glass prism having a prism angle designed to restore the angle of said combined light beam; (l) a second collimator lens for focusing said combined light beam; and (m) a second dual core glass capillary for housing another optical fiber of a second port to receive said combined light beam; (n) whereby because of the optically non-reciprocal property of said Faraday rotators, a light beam from said optical fiber of said second port will have two components having their state of polarization in said other direction perpendicular to said particular direction when passing said planar crystal and therefore receiving a displacement therebetween, and will be focused into said optical fiber of said third port, thereby forming an optical circulator.

Alternatively defined broadly, the present invention is a fiber optical circulator, comprising: (a) at least one multi-core glass capillary for housing at least two optical fibers of a first port and a third port respectively; (b) at least one glass prism having a prism angle designed to correct the angle of a light beam from said first port; (c) at least one birefringent crystal for dividing said light beam into two components; (d) a planar crystal having an optical axis designed to allow light components polarized in a first direction to pass without displacement but create a displacement in light components polarized in a second direction which is perpendicular to the first direction; (e) at least one optically non-reciprocal means for rotating the state of polarization of said two components and causing said two components to be in the same state of polarization in said first direction to pass said planar crystal without displacement; and (f) means for combining said two components into a combined light beam exiting into another optical fiber of a second port; (g) whereby because of said at least one optically non-reciprocal means, a light beam from said optical fiber of said second port will have two components polarized in said second direction when passing said planar crystal and therefore receiving a displacement therebetween, and will exit into said optical fiber of said third port, thereby forming an optical circulator.

Defined more broadly, the present invention is a fiber optical circulator, comprising: (a) a multi-core capillary for housing multiple optical fibers; and (b) optical means for providing angle correction to an off-axis light beam and allowing the light beam to pass with or without displacement in its components depending on the state of polarization of such components.

Of course the present invention is not intended to be restricted to any particular form or arrangement, or any specific embodiment disclosed herein, or any specific use, since the same may be modified in various particulars or relations without departing from the spirit or scope of the claimed invention herein above shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A fiber optical circulator, comprising:
   a. first dual core glass capillary for housing two optical fibers of a first port and a third port respectively;
   b. a first collimator lens for collimating a light beam from said first port;
   c. a first birefringent crystal for dividing said collimated light beam into two orthogonal components with a displacement;
   d. a first Faraday rotator for rotating the state of polarization of said two components;
   e. a first pair of half-wave plates each for passing a respective one of said two components, and causing said two components to be in the same state of polarization in a particular direction;
   f. a crystal prism having a planar portion with an optical axis designed to allow light components polarized in said particular direction to pass without displacement but create a displacement in light components polarized in another direction perpendicular to said particular direction, such that said two components in the same state of polarization in said particular direction passes the crystal prism without displacement, and said crystal prism further having a prism portion with symmetrical surfaces having a prism angle designed to correct the angles of said two components, causing said two components to be parallel to a central axis of said circulator;
   g. a second pair of half-wave plates each for passing a respective one of said two components, and changing the state of polarization of said two components;
   h. a second Faraday rotator for rotating the state of polarization of said two components to be orthogonal;
   i. a second birefringent crystal for combining said two orthogonal components into a combined light beam;
   j. a second collimator lens for focusing said combined light beam;
   k. a second dual core glass capillary for housing another optical fiber of a second port to receive said combined light beam; and
   l. said circulator providing a circulating path for a light beam from said optical fiber of said second port to be circulated into said optical fiber of said third port, and further expandable to a four or more ports optical circulator based on the angle correction property of said symmetrical surfaces of said prism portion of said crystal prism.

2. The fiber optical circulator as claimed in claim 1, wherein said prism portion of said crystal prism has four symmetrical inclined optical surfaces for providing angle correction to off-axis light beams.

3. A fiber optical circulator, comprising:
   a. at least one multi-core glass capillary for housing at least two optical fibers of a first port and a third port respectively;
   b. at least one birefringent crystal for dividing a light beam from said first port into two components;
   c. a crystal prism having a planar portion with an optical axis designed to allow light components polarized in a first direction to pass without displacement but create a displacement in light components polarized in a second direction which is perpendicular to the first direction;
   d. at least one optically non-reciprocal means for rotating the state of polarization of said two components and causing said two components to be in the same state of polarization in said first direction to pass said crystal prism without displacement;
   e. said crystal prism further having a prism portion with symmetrical surfaces having a prism angle designed to correct the angles of said two components;
   f. means for combining said two components into a combined light beam exiting to an optical fiber of a second port; and
   g. said circulator providing a circulating path for a light beam from said optical fiber of said second port to be circulated into said optical fiber of said third port, and further expandable to a four or more ports optical circulator based on the angle correction property of said symmetrical surfaces of said prism portion of said crystal prism.

4. The fiber optical circulator as claimed in claim 3, wherein said prism portion of said crystal prism has four symmetrical optical surfaces for providing angle correction to off-axis light beams.

5. A fiber optical circulator, comprising:
   a. a first dual core glass capillary for housing two optical fibers of a first port and a third port respectively;
   b. a first collimator lens for collimating said light beam from said first port;
   c. a first glass prism having symmetrical surfaces with a prism angle designed to correct the angle of said collimated light beam, causing said collimated light beam to be parallel to a central axis of said circulator;
   d. a first birefringent crystal for dividing said collimated light beam into two orthogonal components with a displacement;
   e. a first Faraday rotator for rotating the state of polarization of said two components;
   f. a first pair of half-wave plates each for passing a respective one of said two components, and causing said two components to be in the same state of polarization in a particular direction;
   g. a planar crystal having an optical axis designed to allow light components polarized in said particular direction to pass without displacement but create a displacement in light components polarized in another direction perpendicular to said particular direction, such that said two components in the same state of polarization in said particular direction passes the planar crystal without displacement;
   h. a second pair of half-wave plates each for passing a respective one of said two components, and changing the state of polarization of said two components;
   i. a second Faraday rotator for rotating the state of polarization of said two components to be orthogonal;
   j. a second birefringent crystal for combining said two orthogonal components into a combined light beam;
   k. a second glass prism having symmetrical surfaces with a prism angle designed to restore the angle of said combined light beam;
   l. a second collimator lens for focusing said combined light beam;
   m. a second dual core glass capillary for housing another optical fiber of a second port to receive said combined light beam; and
   n. said circulator providing a circulating path for a light beam from said optical fiber of said second port to be circulated into said optical fiber of said third port, and further expandable to a four or more ports optical circulator based on the angle correction property of said first glass prism and said second glass prism.

6. The fiber optical circulator as claimed in claim 5, wherein said first glass prism and said second glass prism each has two symmetrical inclined optical surfaces for providing angle correction to off-axis light beams.

7. A fiber optical circulator, comprising:
   a. at least one multi-core glass capillary for housing at least two optical fibers of a first port and a third port respectively;
   b. at least one glass prism having symmetrical surfaces with a prism angle designed to correct the angle of a light beam from said first port;
   c. at least one birefringent crystal for dividing said light beam into two components;
   d. a planar crystal having an optical axis designed to allow light components polarized in a first direction to pass without displacement but create a displacement in light components polarized in a second direction which is perpendicular to the first direction;
   e. at least one optically non-reciprocal means for rotating the state of polarization of said two components and causing said two components to be in the same state of polarization in said first direction to pass said planar crystal without displacement;
   f. means for combining said two components into a combined light beam exiting into another optical fiber of a second port; and
   g. said circulator providing a circulating path for a light beam from said optical fiber of said second port to be circulated into said optical fiber of said third port, and further expandable to a four or more ports optical circulator based on the angle correction property of said at least one glass prism.

8. The fiber optical circulator as claimed in claim 7, wherein said at least one glass prism has two symmetrical optical surfaces for providing angle correction to off-axis light beams.

* * * * *